United States Patent
Suzuki

(10) Patent No.: US 7,967,685 B2
(45) Date of Patent: Jun. 28, 2011

(54) INNER RING FOR CONSTANT VELOCITY UNIVERSAL JOINT AND MANUFACTURING APPARATUS THEREFOR

(75) Inventor: Nobuo Suzuki, Iwata (JP)

(73) Assignee: NTN Corporation, Osaka (JP)

( * ) Notice: Subject to any disclaimer, the term of this patent is extended or adjusted under 35 U.S.C. 154(b) by 386 days.

(21) Appl. No.: 12/225,292

(22) PCT Filed: Feb. 26, 2007

(86) PCT No.: PCT/JP2007/053483
§ 371 (c)(1),
(2), (4) Date: Sep. 18, 2008

(87) PCT Pub. No.: WO2007/111068
PCT Pub. Date: Oct. 4, 2007

(65) Prior Publication Data
US 2010/0227695 A1   Sep. 9, 2010

(30) Foreign Application Priority Data

Mar. 27, 2006 (JP) ................................. 2006-086051
Feb. 23, 2007 (JP) ................................. 2007-043951

(51) Int. Cl.
*F16D 3/224* (2011.01)
(52) U.S. Cl. ........................................ 464/145; 72/399
(58) Field of Classification Search .................. 464/15, 464/144, 145, 906; 72/354.2, 399; 384/49, 384/55, 516
See application file for complete search history.

(56) References Cited

U.S. PATENT DOCUMENTS

| | | | |
|---|---|---|---|
| 2,987,897 A * | 6/1961 | Spence | ......................... 464/145 |
| 4,319,465 A | 3/1982 | Ito et al. | |
| 5,167,584 A * | 12/1992 | Krude | ........................... 464/145 |
| 6,044,684 A | 4/2000 | Ohama et al. | |
| 2003/0130048 A1 | 7/2003 | Fuhrmann et al. | |

FOREIGN PATENT DOCUMENTS

| | | | | |
|---|---|---|---|---|
| DE | 10 2004 009 519 | 12/2004 | | |
| GB | 2 036 255 | 6/1980 | | |
| JP | 55-76219 | 6/1980 | | |
| JP | 55-126124 A | * 9/1980 | | ................... 464/145 |
| JP | 57-56132 | 4/1982 | | |
| JP | 58-50148 | 3/1983 | | |
| JP | 62-193938 | 8/1987 | | |
| JP | 11-114652 | 4/1999 | | |
| JP | 2000-140984 | 5/2000 | | |
| JP | 2003-176833 | 6/2003 | | |
| JP | 2003-184906 | 7/2003 | | |

OTHER PUBLICATIONS

Supplementary European Search Report dated May 7, 2010 in corresponding European Application No. 07714915.
International Search Report mailed Apr. 3, 2007 for International Application No. PCT/JP2007/053483.

* cited by examiner

*Primary Examiner* — Greg Binda
(74) *Attorney, Agent, or Firm* — Wenderoth, Lind & Ponack, L.L.P.

(57) ABSTRACT

An inner ring of a constant velocity universal joint includes ball tracks formed in an outer surface at predetermined intervals in a circumferential direction. Portions of side walls of the ball tracks that form edge lines with the outer surface are formed with a chamfer along the entire length of the axial direction.

11 Claims, 8 Drawing Sheets

INNER RING FOR CONSTANT VELOCITY UNIVERSAL JOINT AND MANUFACTURING APPARATUS THEREFOR

TECHNICAL FIELD

This invention relates to an inner ring for a constant velocity universal joint and a manufacturing apparatus therefor.

BACKGROUND ART

Constant velocity universal joints are widely used in applications where power is transmitted from one to another of rotational axes coupled to each other at an angle, such as in the power transmission system of automobiles or various types of industrial machines. Ball type constant velocity universal joints use balls as torque transmitting elements. The balls retained with a cage are set in ball tracks of an inner ring and an outer ring. The track centers are equally offset in opposite directions relative to the joint center so as to maintain the balls in a bisecting plane of the input shaft and the output shaft to keep the constant speed.

In a cross groove constant velocity universal joint ("Lobro joint" or "LJ"), for example, which has ball tracks inclined relative to the rotational axis, the ball tracks of the inner ring and outer ring are inclined relative to the rotational axis symmetrically with each other at the same angle so as to satisfy the requirements of a constant velocity universal joint and to achieve flexibility. FIG. 7A and FIG. 7B illustrate the shape of an inner ring or its intermediate product (hereinafter "product") of an LJ. Reference numeral 12 in the drawing represents ball tracks in which balls will roll when the product is assembled as a constant velocity universal joint. The ball tracks are formed at six locations in the outer circumference of the product 10. These ball tracks 12 are inclined relative to the axial line of the product 10, and adjacent ball tracks 12 are inclined oppositely from each other. Outer circumferential parts 14 other than the ball tracks 12 are generally partially spherical.

Since the LJ inner ring is an irregular shape component, it is generally produced through forging and machining processes. That is, a plurality of divided dies formed with a projection at an inner end to form the ball tracks are circumferentially equally arranged such as to surround a stock, which is then pressed in the axial direction using a pair of punches to make the material extend radially in order to form the ball tracks.

A forging die for forming the ball tracks is, as described for example in Japanese Patent Application Laid-Open Nos. Sho 57-56132 and Sho 62-193938, divided in the circumferential direction in the number of tracks to be provided in the product. The positioning of dies in the circumferential direction was achieved by providing a guide die for guiding the dies in a radial manner and by accommodating the dies in the guide die. The positioning of dies in the radial direction was achieved by providing the dies with a conical back surface and by fitting a ring having a conical surface on its inner circumference with the outer side of the dies.

With these conventional methods described above, the dies slide on the guide die in a radial manner, and a gap needs to be provided between the dies and the guide die. This makes the guide width of the guide die which is for positioning the dies in the circumferential direction larger than the die width dimension, because of which it is difficult to improve the precision in the circumferential direction of the product. Moreover, since the die back surface forms part of the conical surface, the dies have low rigidity against a force applied at an angle, because of which the dies totter due to the pressure exerted during the processing, which makes it difficult to improve the precision of the angle of inclined grooves. Therefore the inclined grooves in the product are not formed with a sufficient precision with respect to the circumferential pitch and angle.

The applicant of the present invention has proposed a forging method and apparatus, as described in Patent Document 1, which can solve these problems described above and which can achieve high precision required in the circumferential pitch and inclination angle of the grooves in the product.

[Patent Document 1] Japanese Patent Application Laid-Open No. 2000-140984

DISCLOSURE OF THE INVENTION

Problems to be Solved by the Invention

The forged inner ring of a constant velocity universal joint undergoes a machining process to finish both end faces, the inside diameter, and the outside diameter. Since the inner ring has an outer shape that is substantially partially spherical with ball tracks formed in the outer surface, the finishing operation on the outer surface is intermittent, because of which large machining burrs are created when the machining tool moves from the outer surface towards a ball track. Such burrs will impede the rolling motion of balls in the ball tracks and deteriorate the function of the constant velocity universal joint, and therefore a machining process step is essential to remove the burrs.

After the machining process, if edge line portions that connect the side walls of the ball tracks and the outer surface are sharp-angled, then the product is more liable to be dented during transfer, for example, in a heat treatment process. Any projections or bulges on the ball tracks caused by dents will impede the rolling motion of the balls in the ball tracks and deteriorate the function of the constant velocity universal joint, and so the product will need to be mended or discarded.

An object of this invention is to solve these problems described above associated with the inner ring of a constant velocity universal joint.

Means for Solving the Problems

An inner ring for a constant velocity universal joint according to this invention includes ball tracks formed at predetermined intervals in the circumferential direction and is characterized in that a portion of a side wall of the ball track that forms an edge line with an outer surface is formed with a chamfer over an entire axial length. The chamfer is formed during the forging. The chamfer provides a sort of a recess, which prevents creation of detrimental burrs without special adjustment during a turning process of the outside diameter. Or, even if some burrs are created, they are kept to a minimum and can be easily removed by a tumbler or the like. The dimension (depth) of the recess is set such that even when some burrs are created on the edge line portion, they will not protrude into the ball track. To give a specific example, it is about 0.5 mm if the ball diameter is 20 mm. The chamfers are formed by forging such that, on the outer surface side of the turning position of the outside diameter, the chamfer profile is steeper on the outer surface side (see FIG. 1), so as to minimize stress on the chamfer-forming parts of the dies, which can improve the die life.

A manufacturing apparatus for an inner ring for a constant velocity universal joint according to this invention includes a die including a plurality of radially movable divided dies provided with a projection at an inner end for forming grooves in the product and radially arranged such as to surround a stock, and a die base for positioning the divided dies in a radial direction by making engagement with outer ends of the divided dies, and is characterized in that the die base is provided with recesses which are separate from each other in a circumferential direction and which have a shape that is obtained by transferring the shape of the outer end of the divided die.

In this structure, the divided dies are positioned not only in the radial direction but also in the circumferential direction, with their outer ends being fixedly secured in the recesses in the die base, and therefore the divided dies make tight contact with the die base during the forming operation. That is, the recesses in the die base and the outer ends of the divided dies make tight contact with each other with high rigidity when pressure is applied during the processing. Therefore, a highly precise circumferential pitch and inclination angle required for the inclined grooves of the product are achieved.

The rear end of the divided dies and the recess in the die base are in engageable relationship with each other as the shape (contour) of one of them is obtained by transferring that of the other. For example, the outer end of the divided die includes a side face facing in the circumferential direction and an outer end face facing radially outwards, with the side face being tapered from the inner end side toward the outer end side of the divided die, as well as being tapered from the bottom side toward the top side, while the recess of the die base has a side wall face having a shape that is obtained by transferring the side face of the divided die.

A gap may be provided between adjacent divided dies.

Effect of the Invention

According to this invention, according to this invention (sic), no such situation will arise where burrs created in an edge line portion between the side wall of the ball track and the outer surface adversely affect the balls rolling in the ball tracks to deteriorate the function of the constant velocity universal joint. Since the machining process for removing the burrs can be omitted, a reduction in the production cost by that much can be realized. Moreover, sharp-angled portions are eliminated from the product because of the chamfers, so that dents are less likely to be created during transportation of the product. Even if a dent is created during transportation of the product, it is prevented that the deformation extends over to the side wall of the ball track, and therefore the trouble of dent repair and defective products is avoided.

Figure 1A:
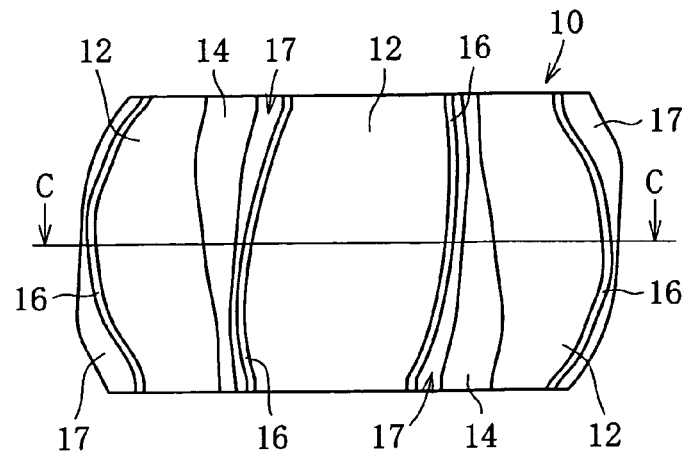
FIG. 1A is a front view of an inner ring for a cross groove constant velocity universal joint according to one embodiment.

DESCRIPTION OF THE REFERENCE NUMERALS 1 stock
10 product (inner ring or intermediate product)
12 ball track
14 outer surface
16 chamfer
2 lower die half
20 die
22 divided dies
24 inner end
24a projection
26 outer end
26a side face
26b outer end face
28 die guide
4b lower ring punch
5b lower counter punch
6b lower billet guide
7 back-up ring
8 platform
9 spring
3 upper die half
30 die base
32 space
34 recess
34a side wall face
4a upper ring punch
5a upper counter punch
6a upper billet guide

DETAILED DESCRIPTION OF THE INVENTION

One embodiment of the present invention will be hereinafter described with reference to the drawings.

Figure 1B:
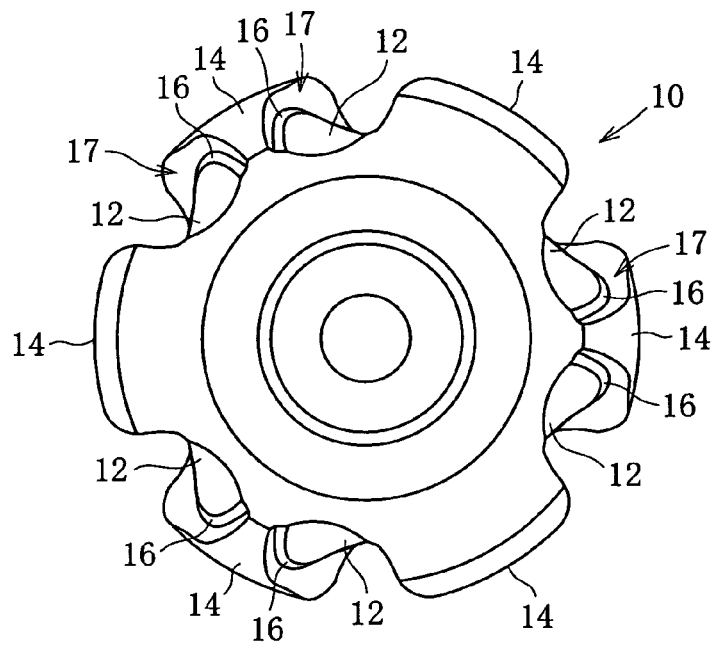
FIG. 1B is a top plan view of the inner ring of FIG. 1A.
Figure 1C:
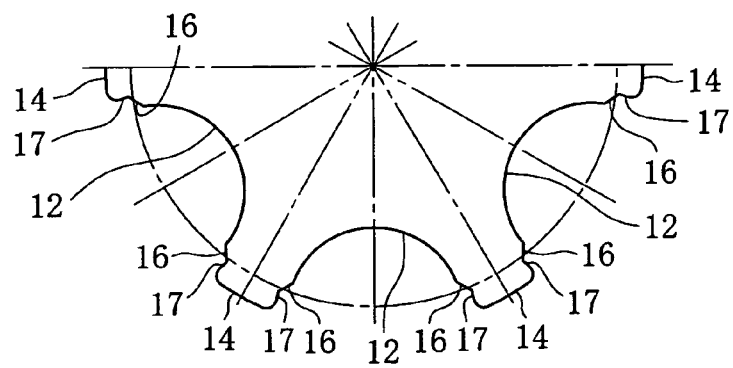
FIG. 1C is a cross-sectional view of the inner ring of FIG. 1A.
Figure 7A:
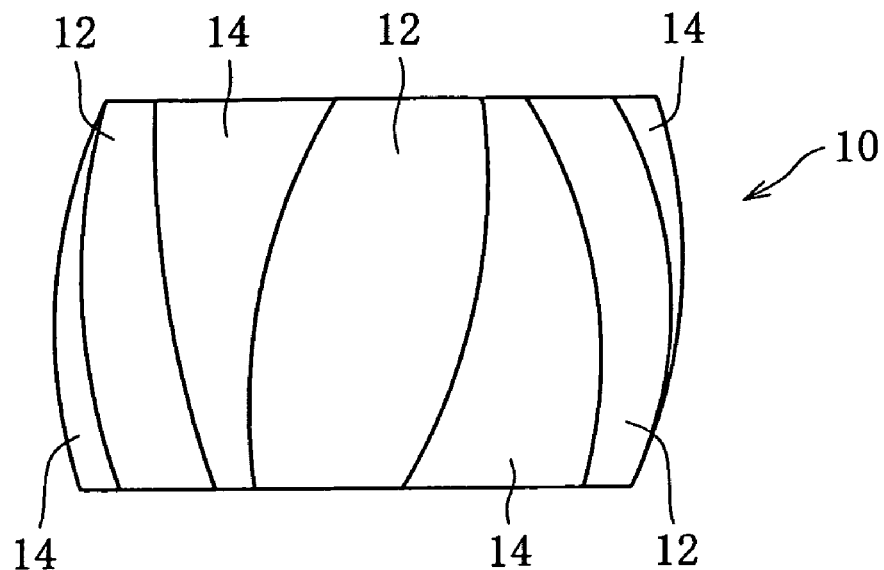
FIG. 7A is a front view of an inner ring for a cross groove constant velocity universal joint according to a comparative example.
Figure 7B:
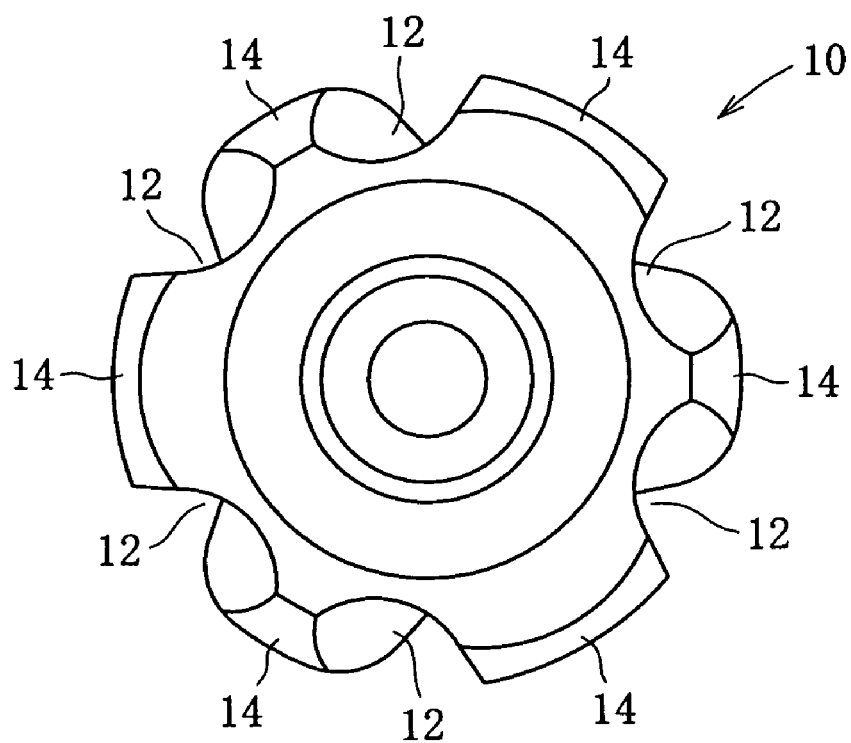
FIG. 7B is a top plan view of the inner ring of FIG. 7A.

As shown in FIG. 1A to FIG. 1C, the inner ring 10 of a constant velocity universal joint has ball tracks 12 formed at predetermined intervals in the circumferential direction in a partially spherical outer surface 14. The ball tracks 12 are cut through in the axial direction, and adjacent ball tracks 12 are inclined relative to the axial line oppositely from each other. Portions of the side walls of each ball track 12 forming the edge lines with the outer surface 14 are formed with a chamfer 16 over the entire axial length. Referring now to FIG. 7 mentioned before for comparison, there are no such chamfers 16 in the edge line portions between the side walls of the ball tracks 12 and the outer surface 14 of the inner ring 10, and the edge line portions have a sharp angle. The chamfers 16 should preferably be formed with dies during forging, because that way the die pattern is precisely transferred, making it easy to determine the forming positions and to freely select the cross-sectional shape of the chamfers, whereby precise chamfers can be formed within a tolerance range that does not deteriorate the product functions.

Figure 2B:
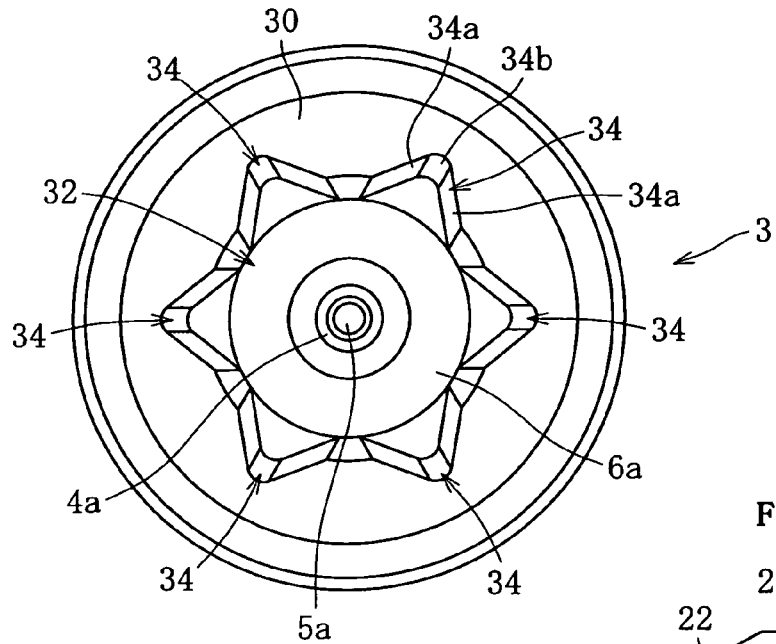
FIG. 2B is a bottom plan view of an upper die half in a manufacturing apparatus for the inner ring for a constant velocity universal joint according to one embodiment.
Figure 2C:
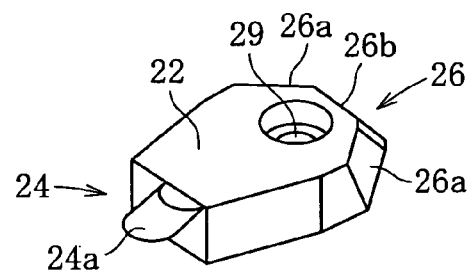
FIG. 2C is a perspective view of a divided die.
Figure 2A:
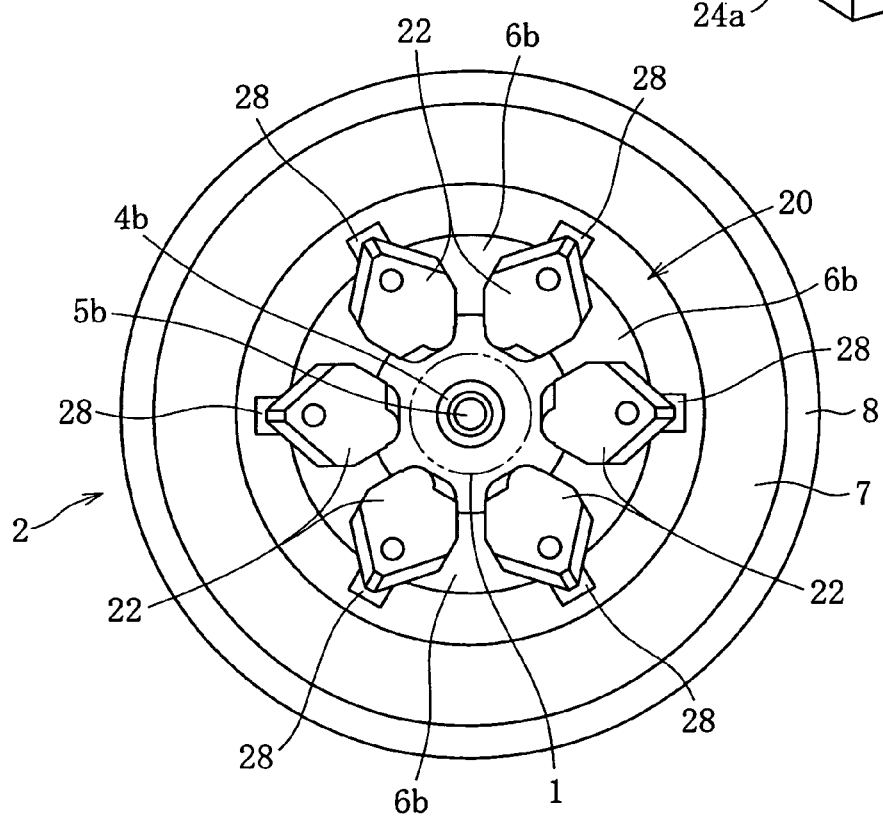
FIG. 2A is a top plan view of a lower die half in a manufacturing apparatus for the inner ring for a constant velocity universal joint according to one embodiment.
Figure 3A:
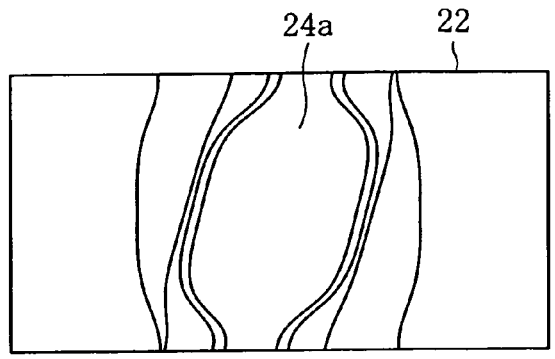
FIG. 3A is a front view of a divided die.
Figure 3B:
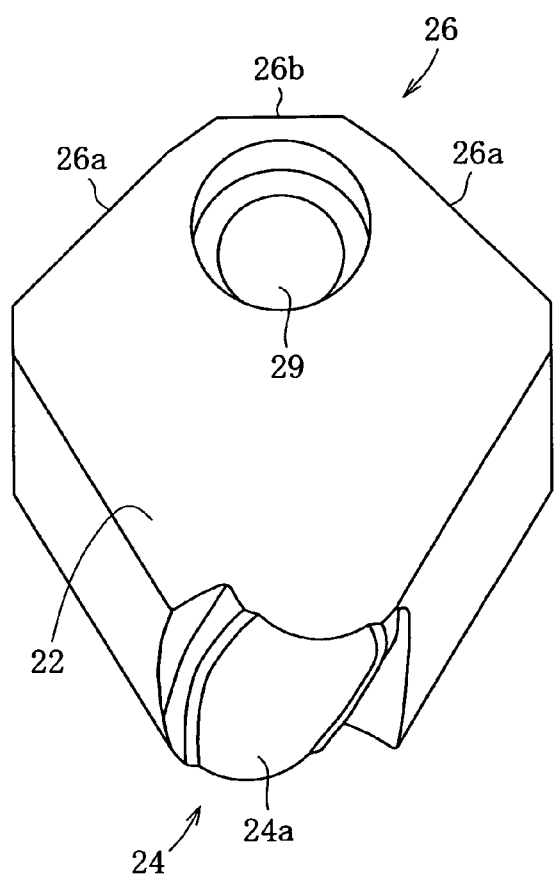
FIG. 3B is a perspective view of the divided die.
Figure 3C:
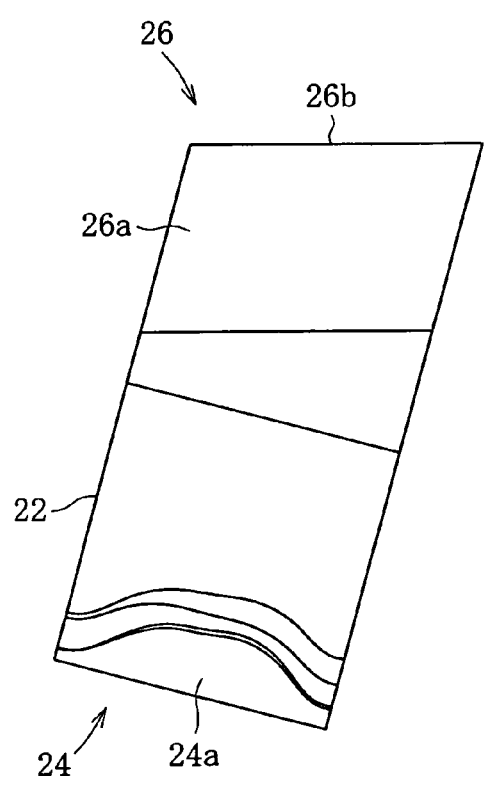
FIG. 3C is a side view of the divided die.

Next, the structure of the manufacturing apparatus for the inner ring for a constant velocity universal joint will be described with reference to FIG. 2A to FIG. 2C, FIG. 3A to FIG. 3C, FIG. 4, and FIG. 5. FIG. 2A and FIG. 2B are a top plan view of a lower die half and a bottom plan view of an upper die half, respectively, and FIG. 4 is a longitudinal cross-sectional view of the entire apparatus.

Figure 4:
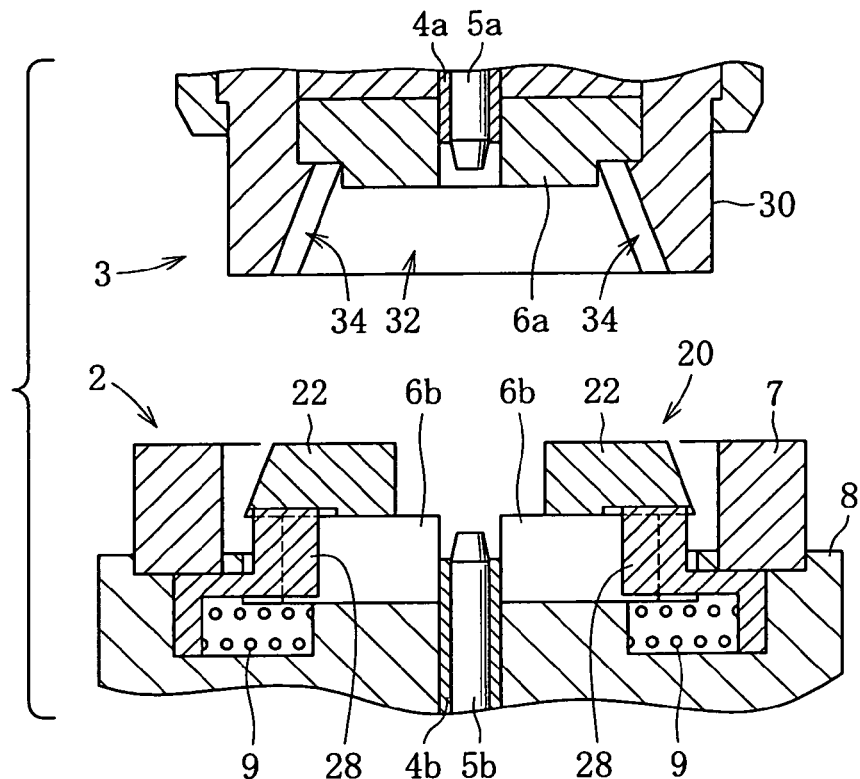
FIG. 4 is a longitudinal cross-sectional view of the manufacturing apparatus for the inner ring for a constant velocity universal joint.

This apparatus includes a lower die half 2 and an upper die half 3 aligned coaxially, as shown in FIG. 4, and in the illustrated embodiment, both the lower die half 2 and the upper die half 3 are movable by means of a driving mechanism. The lower die half 2 is made up of a platform 8, a lower billet guide 6b, a die 20, a lower ring punch 4b, a lower counter punch 5b, and a back-up ring 7. The upper die half 3 is made up of a die base 30, an upper billet guide 6a, an upper ring punch 4a, and an upper counter punch 5a.

The lower billet guide 6b is arranged on the stationary platform 8, and the die 20 is arranged on the lower billet guide 6b. As can be seen from FIG. 2A, the die 20 consists of divided dies 22 circumferentially radially arranged, in the same number as the number of ball tracks 12 of the product 10 (see FIG. 1A to FIG. 1C). Each of the divided dies 22 includes, as shown in FIG. 2C and FIG. 3A to FIG. 3C, a projection 24a on the inner end 24 so as to form the ball tracks 12 of the product 10. As has been mentioned before with reference to FIG. 1A to FIG. 1C, the ball tracks 12 of the product 10 are inclined alternately in opposite directions, and so adjacent divided dies 22 each have their projections 24a inclined in opposite directions (see FIG. 2A). The outer end 26 of the divided dies 22 in the illustrated embodiment includes side faces 26a facing in the circumferential direction and an outer end face 26b facing radially outward. The side faces 26a are tapered surfaces tapering from the inner end 24 toward the outer end 26 of the divided dies 22 as well as tapering from the bottom side to the top side.

Figure 5:
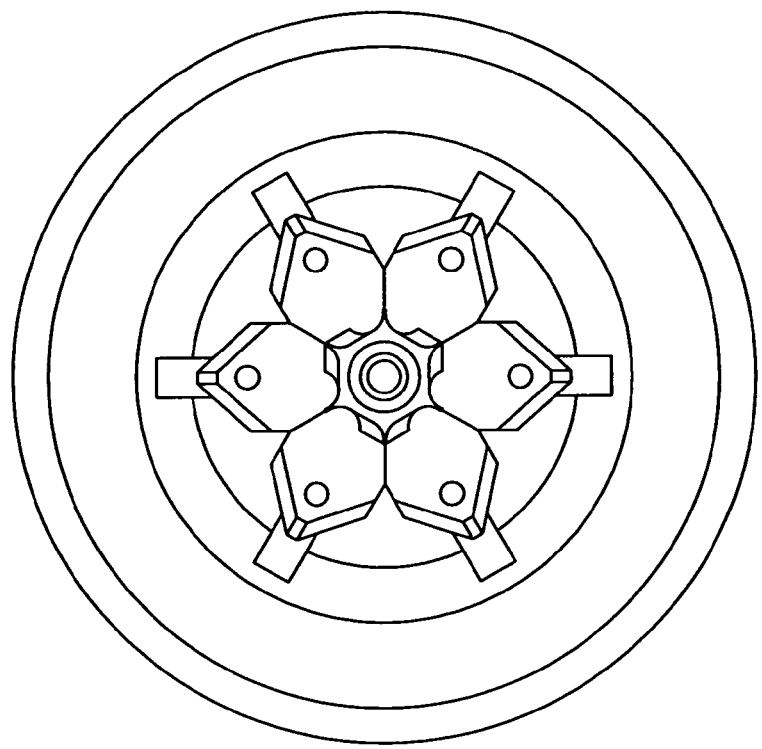
FIG. 5 is a top plan view of the lower die half in which the die is radially contracted.

Each divided die 22 is placed on the lower billet guide 6b such as to be movable in the radial direction of the die 20. The lower billet guide 6b includes the same number of grooves in the circumferential direction as the number of ball tracks 12 of the product 10. Each divided die 22 is provided with a die guide 28, which is guided in the above-mentioned groove of the lower billet guide 6b so as to be set generally in its circumferential position relative to the upper die half 3, and which is also movable in the radial direction of the die 20 in the above-mentioned groove. Reference numeral 29 in FIG. 2C and FIG. 3B denotes a through hole for inserting a bolt for tightening the die guide 28 to the divided die 22. The die guide 28 is kept biased with a spring (compression coil spring) 9 so as to keep the die 20 resiliently in a radially extended state (FIG. 2A). FIG. 5 shows a state in which the divided dies 22 have moved radially inwards against the force of the springs 9 so that the die 20 is radially contracted.

The lower ring punch 4b and the lower counter punch 5b are coaxially and freely slidably arranged in the inner bore portion of the lower billet guide 6b. The lower ring punch 4b and the lower counter punch 5b have a shape that conforms to the shape of the lower end face of the product 10.

The back-up ring 7 is secured on the platform 8 such as to surround the outer circumference of the die 20 and the lower billet guide 6b. The back-up ring 7 is cylindrical and its inner surface is capable of fitting with the outer surface of the die base 30 so as to prevent radial expansion and chipping of the die base 30 during the forming of the product.

The upper die half 3 is moved up and down by a press slide, which is not shown. The die base 30 of the upper die half 3 is open at the lower end and has a bowl shape, and includes, as shown in FIG. 2B, a space 32 in a substantially conical trapezoidal shape and recesses 34 that are circumferentially equally arranged in the inner surface. The number of the recesses 34 is matched with the number of divided dies 22, which is six in the illustrated embodiment, and accordingly, they take on a star shape as a whole. The shape of each recess 34 is the one that is achieved by transferring the shape of the side faces 26a at the outer end 26 of the divided die 22. That is, the recess 34 includes a pair of side wall faces 34a that are tapered from the radially inner side to the outer side of the die base 30. The side wall faces 34a are also tapered from the open lower end side toward the upper inner side of the die base 30. Since these side wall faces 34a and the side faces 26a of the rear ends 26 of the divided dies 22 fit with each other as will be described later, the outer end face 34b of the recess 34 is formed to give a clearance so that it will not interfere with the rear end face 26b of the divided die 22. The outer end face 34b has a radius of curvature R of 10 to 20 mm in order to prevent radial expansion and chipping during the forming of the product. A work-affected layer created during the machining of recesses 34 through wire cutting or electric discharge machining is removed from the recesses 34. Furthermore, in order to eliminate any points from which chipping may start, the recesses 34 are lap-finished to have a surface roughness of Ra being 0.5 or less.

The upper billet guide 6a makes the bottom face of the bowl-shaped die base 30. The upper ring punch 4a and the upper counter punch 5a are coaxially and freely slidably arranged in the inner bore portion of the upper billet guide 6a. The upper ring punch 4a and the upper counter punch 5a have a shape that conforms to the shape of the upper end face of the product 10.

Figure 6A:
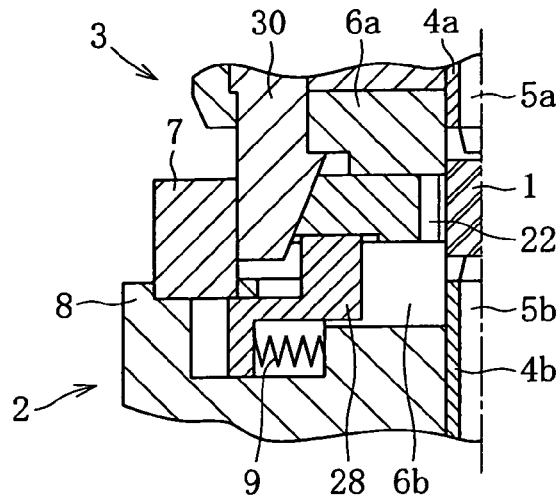
FIG. 6A is a diagram showing a process step of the forming process.

Next, the forming process performed using the apparatus configured as described above will be described with reference to FIG. 6A to FIG. 6C.

Since the die guides 28 are constantly subjected to a force of the springs 9 that keep them open outwards, the divided dies 22 are always open on the radially outer side (see FIG. 2A and FIG. 4) unless a force is applied from outside. In this state, a stock 1 is supplied inside the lower billet guide 6b and on the lower counter punch 5b, after which the press slide is lowered.

This makes the side wall faces 34a of the recesses 34 in the die base 30 (FIG. 2A) and the side faces 26a at the outer ends 26 of the divided dies 22 engage with each other, pushing the divided dies 22 radially inwards, thereby positioning the dies both in the radial direction and in the circumferential direction. At this time, the upper billet guide 6a makes contact with the divided dies 22, and the upper and lower billet guides 6a and 6b and the divided dies 22 together form a space (cavity) that conforms to a shape defined by the ball tracks 12 and upper and lower end faces of the product 10.

Figure 6B:
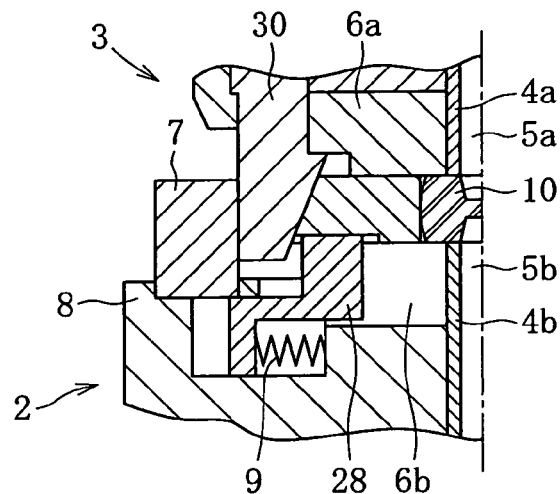
FIG. 6B is a diagram showing a process step of the forming process.

When the press slide is further lowered, as shown in FIG. 6B, the upper and lower counter punches 5a and 5b and upper and lower ring punches 4a and 4b apply a pressure on the stock 1, causing a plastic flow in the material, whereby the above-mentioned space (cavity) is filled with the material when the press slide has reached its lower dead point. As a result, the product 10 is obtained.

Figure 6C:
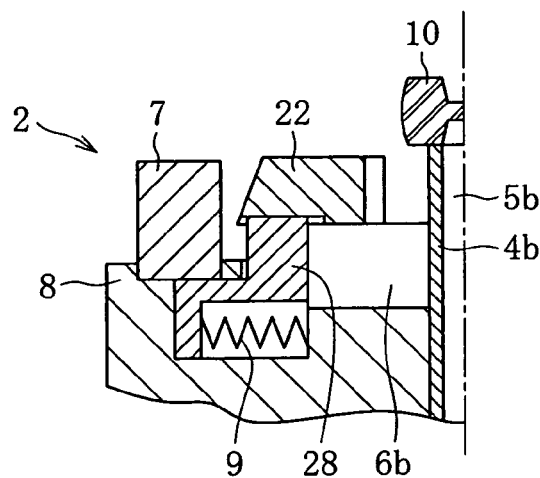
FIG. 6C is a diagram showing a process step of the forming process.

After that, as shown in FIG. 6C, the press slide goes up so that the upper die half 3 separates from the lower die half 2 and the divided dies 22 move radially outwards to radially extend the die 20, after which the product 10 is taken out by a knock-out mechanism (not shown). The product 10 at this stage is still an intermediate product as compared to the final product inner ring; it will be finished into a final product through drilling, serration or splining, and heat treatment or the like.

Incidentally, precision errors are inevitable in the production of divided dies or any other forging dies, and therefore a precision standard is set corresponding to preset dimension tolerances. However, if the tolerances are set such that adjacent divided dies make close or tight contact with each other, they may be affected by their precision errors with each other and the accumulated precision errors may lead to deterioration of the product precision. When the adjacent divided dies make close or tight contact with each other on their inner side and also when their outer surfaces are restricted by a die base, the divided dies and the guide ring may be subjected to excessive surface pressure, which leads to the risk of breakage or the like.

Figure 8:
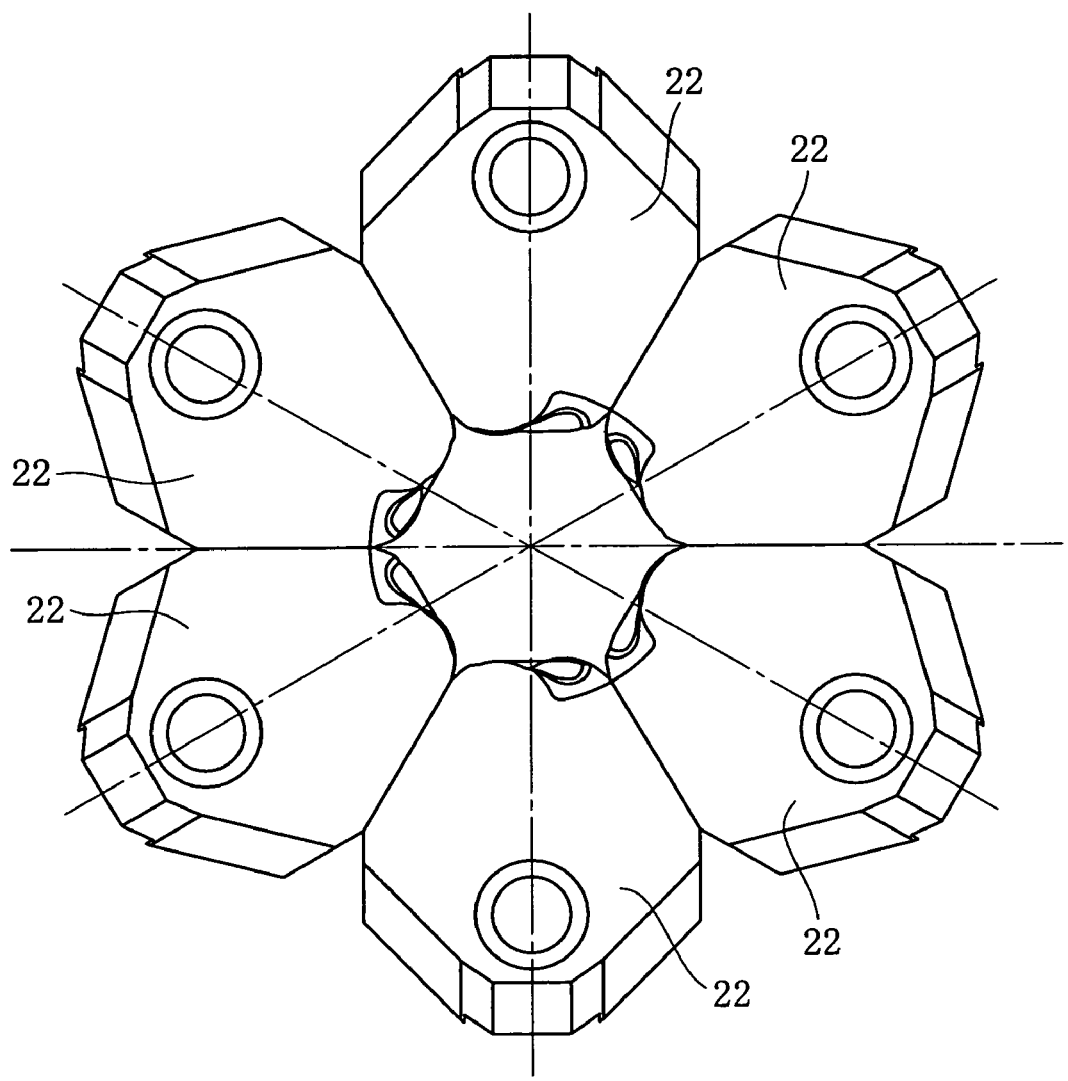
FIG. 8 is an enlarged view of a group of divided dies without gaps therebetween.
Figure 9:
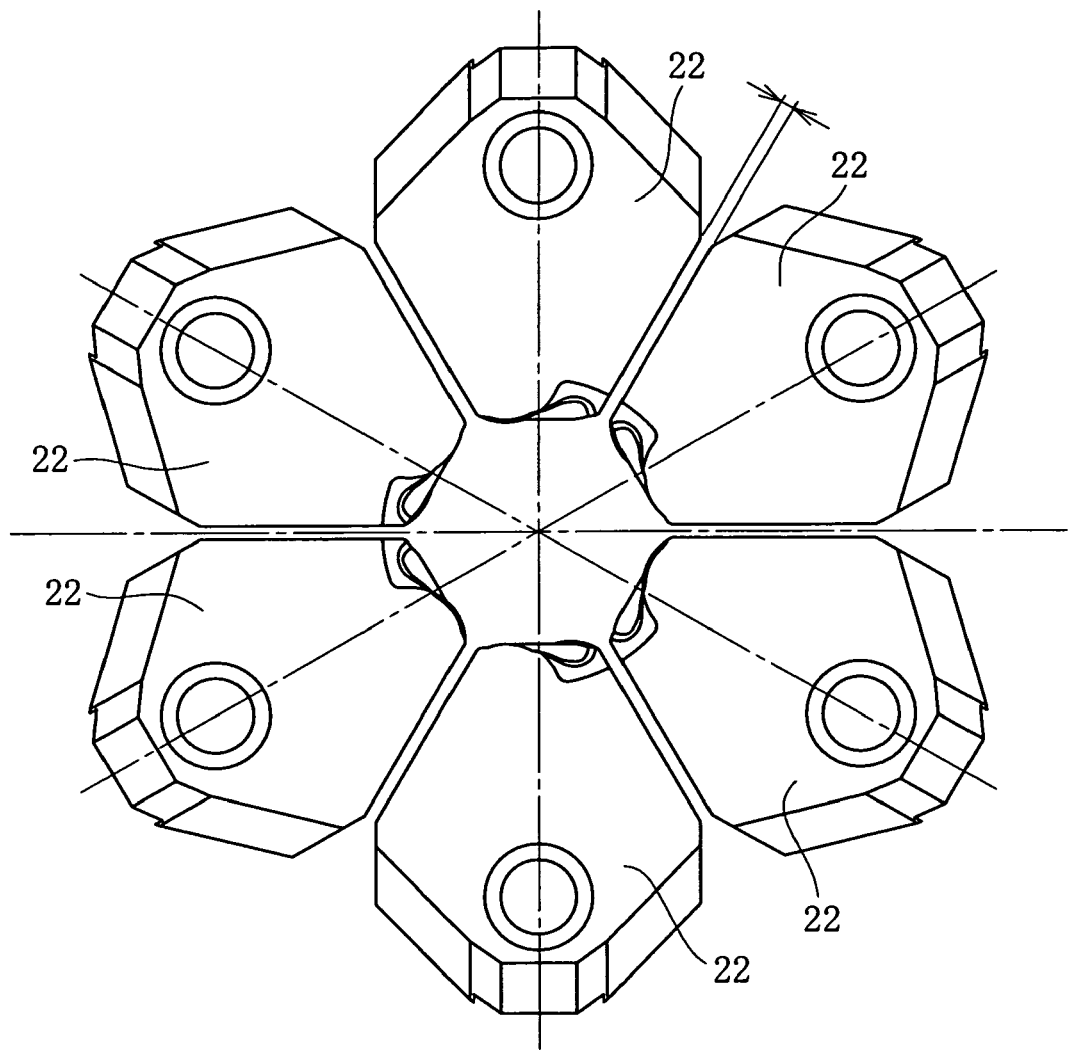
FIG. 9 is an enlarged view of a group of divided dies with gaps disposed between the divided dies.

FIG. 8 and FIG. 9 illustrate the divided dies 22 only of FIG. 5. As is clear from a comparison between these drawings, gaps are provided between adjacent divided dies 22 in FIG. 9. It is preferable to provide a gap of at least 0.1 mm or more as shown in FIG. 9 between each adjacent divided dies 22 in consideration of the production errors and elastic deformation of the divided dies and die base, so that the adjacent divided dies 22 do not make contact with each other even when the divided dies 22 are moved radially inwards so that the die is in its radially contracted state. Thereby, adjacent divided dies do not make contact with each other, but the divided dies make contact only with the stock at their inner ends, whereby accumulation of the production precision errors of the divided dies is prevented, and also, the risk of generating excessive surface pressure is prevented. As a result that accumulation of production precision errors of the divided dies is prevented, an increase is achieved in the precision of the circumferential pitch or inclination angle (or squareness relative to the widthwise end face) of the forged track grooves and the distance from the radial center of the product, which increases the precision of the product, when the product is used without performing a finish removal operation on the track grooves after heat treatment. It reduces or levels removal stock if the track grooves undergo the finish removal operation after heat treatment, whereby time required for the finish removal operation is shortened and tool life is increased, enabling a reduction in the production cost. Moreover, since the risk of generating excessive surface pressure on the divided dies or die base is eliminated, a reduction in the forging cost is made possible due to the improvement in life of the divided dies and die base.

While the invention has been described with respect to a cross groove constant velocity universal joint (Lobro joint or LJ) as one example, the invention can be applied similarly to the inner ring or intermediate product of other constant velocity universal joints.

The invention claimed is:

1. An inner ring for a constant velocity universal joint, the inner ring comprising:
   an outer surface; and
   a plurality of ball tracks formed in the outer surface at predetermined intervals in a circumferential direction of the inner ring, the ball tracks being formed such that adjacent ball tracks are inclined in opposite directions from each other with respect to an axial direction of the inner ring,
   wherein an edge line is formed between the outer surface and a portion of a side wall of each of the ball tracks, and
   wherein a chamfer is formed at each edge line by forging, each chamfer extending over an entire axial length of the edge line.

2. The inner ring of claim 1, wherein the ball tracks are configured and arranged for a cross groove constant velocity universal joint.

3. The inner ring of claim 1, wherein the sidewall of each of the ball tracks includes a surface extending outwardly from the chamfer in a substantially radial direction.

4. A manufacturing apparatus for manufacturing an inner ring having an outer surface and a plurality of ball tracks formed in the outer surface at predetermined intervals in a circumferential direction of the inner ring, the ball tracks being formed such that adjacent ball tracks are inclined in opposite directions from each other with respect to an axial direction of the inner ring, wherein an edge line is formed between the outer surface and a portion of a side wall of each of the ball tracks, and wherein a chamfer is formed at each edge line by forging, each chamfer extending over an entire axial length of the edge line, the apparatus comprising:
   a die including a plurality of radially movable divided dies provided with a projection at an inner end for forming tracks in the inner ring, the movable divided dies being radially arranged such as to surround a stock; and
   a die base for positioning the divided dies in a radial direction by engaging outer ends of the divided dies,
   wherein the die base is provided with recesses which are separate from each other in a circumferential direction and which have a shape that is obtained by transferring a shape of the outer end of the divided die, and
   wherein the divided dies are radially movable to an innermost position for forging a stock into the inner ring, and the divided dies are configured such that gaps are provided between adjacent divided dies at the innermost position, and
   wherein the projection of each of the divided dies includes a forming portion for forming the chamfer, and the divided dies are shaped to form adjacent ball tracks of the inner ring inclined in opposite directions from each other with respect to an axial direction of the inner ring.

5. The manufacturing apparatus of claim 4, wherein the outer end of each divided die includes a side face facing in the circumferential direction and an outer end face facing radially outwards, and the side face is tapered from an inner end side toward an outer end side of the divided die and is also tapered from a bottom side toward a top side, and
   wherein the recess of the die base has a side wall face having a shape that is obtained by transferring a shape of the side face of the divided die.

6. The manufacturing apparatus of claim 5, wherein the gaps between adjacent dies are at least 0.1 mm.

7. The manufacturing apparatus of claim 4, wherein the gaps between adjacent dies are at least 0.1 mm.

8. The manufacturing apparatus of claim 4, wherein the recesses of the die base engage the divided dies and radially move the divided dies by relative movement between the die and the die base in an axial direction.

9. The manufacturing apparatus of claim 8, wherein the shape of the recesses is configured to engage the divided dies.

10. The manufacturing apparatus of claim 4, wherein the apparatus forms a stock into an intermediate product, and the divided dies are configured such that the chamfer is formed in the intermediate product by forging and a surface extending outwardly from the chamfer in a substantially radial direction is included in the sidewall of each of the ball tracks.

11. The manufacturing apparatus of claim 4, wherein the divided dies are configured and arranged to form ball tracks in the inner ring for a cross groove constant velocity universal joint.

* * * * *